United States Patent [19]

Suzuki

[11] 3,745,371

[45] July 10, 1973

[54] SHIFT REGISTER USING INSULATED GATE FIELD EFFECT TRANSISTORS

[75] Inventor: Yasoji Suzuki, Kawasaki-shi, Kawasaki, Japan

[73] Assignee: Tokyo Shibaura Electric Co., Ltd., Kawasaki-shi, Japan

[22] Filed: Aug. 10, 1971

[21] Appl. No.: 170,610

[52] U.S. Cl. .................. 307/221 C
[51] Int. Cl. .................. G11c 11/40
[58] Field of Search .................. 307/221 R, 221 B, 307/221 C

[56] References Cited

UNITED STATES PATENTS

| | | | |
|---|---|---|---|
| 3,322,974 | 5/1967 | Ahrons et al. | 307/221 C |
| 3,297,950 | 1/1967 | Lee | 307/221 R |
| 3,431,433 | 3/1969 | Ball et al. | 307/221 C |
| 3,493,785 | 2/1970 | Rapp | 307/221 C |
| 3,551,692 | 12/1970 | Yen | 307/221 C |

*Primary Examiner*—John S. Heyman
*Attorney*—Kemon, Palmer & Estabrook

[57] ABSTRACT

A static shift register in which each shift register unit half comprises a main shift gate including a main shift gate section having an input terminal to which preset binary coded signals are applied and a clock gate section having a gate on which clock pulses for shifting from unit to unit are impressed, an inverter connected to the output of the main shift gate section, and an auxiliary shift gate including a shift gate section with its input coupled to the output of the inverter and with its output coupled to the input of the inverter and a clock gate section having a gate on which clock pulses with a phase inverted with respect to that of the first-mentioned clock pulses are impressed.

The main and auxiliary shift gate section, the main and auxiliary clock gate section, and the inverter each comprises a complementary pair of insulated gate enhancement type field effect transistors.

8 Claims, 41 Drawing Figures

PRIOR ART

SHIFT REGISTER USING INSULATED GATE FIELD EFFECT TRANSISTORS

This invention relates to a shift register using insulated gate enhancement type field effect transistors (hereinafter referred to as "IGFET") and more particularly to a static type shift register suitable for an integrated circuit version (hereinafter referred to as "IC").

The extent to which the IC techniques are applied in designing the aforementioned type of shift register is generally evaluated by the following three major considerations:

1. how much power consumption is reduced
2. how much a power supply system is simplified
3. how symmetrical is the electrical as well as physical arrangement of the IGFET's FIG. 1 represents a typical example of a prior art static shift register manufactured by utmost application of the IC techniques. FIG. 1 shows the arrangement of only one unit section of said shift register, wherein each half unit portion comprises a pair of one P channel and one N channel IGFET's 11P-11N (or 12P-12N); the gates are connected together to form an input terminal $I_f$ (or $I_r$); and the drains are connected together to form an output terminal $O_f$ (or $O_r$). Further, the sources of the P channel IGFET's 11P and 12P of said two pairs 11P-11N and 12P -12N are connected to a positive power source grounded and the N channel IGFET's 11N AND 12-N are connected to a negative power source −V, thereby constituting a forward half shift gate 11 and a rear half shift gate 12 arranged in complementary circuit relationship.

Between the input terminal $I_n$ impressed with the desired input data as later described and the input $I_f$ of the forward half shift gate 11, between the output $O_f$ of the forward shift gate 11 and the input $I_r$ of the rear half shift gate 12, and between the output of the one bit shift register, that is, the output $O_r$ of the rear half shift gate and the input $I_f$ of the forward half shift gate 11, there are disposed a P channel IGFET 13P and two N channel IGFET's 14N and 15N shown in FIG. 1 (hereinafter referred to as "coupling IGFET's") whose source-drain paths are connected so as to effect first, second and third transmissions or be used as coupling gates. The substrate electrodes of the P channel IGFET's 11P, 12P and 13P are connected to ground, and the substrate electrodes of the N channel IGFET's 11N, 12N, 14N and 15N are connected to the negative power source −V. The gates of the first and second coupling IGFET's 13P and 14N are connected together to form a common gate $G_1$ (hereinafter referred to as "a first clock gate"), which is impressed with the later described clock pulses $\phi_n$. The gate $G_2$ of the third coupling IGFET'N (hereinafter referred to as "a second clock gate") is supplied with the later described clock pulses $\phi_p$. In this case, the input terminal $I_n$ is impressed with preset input data consisting of a series of binary ONE (designated as "1") and binary ZERO (designated as "0") shown in FIG. 2C at an interval $\tau$ required for a one bit shift.

The first clock gate $G_1$ is impressed with clock (or shift) pulses $\phi_n$ consisting of pulses of appropriate negative voltage representing a binary 0 and pulses normally of grounding voltage denoting a binary 1 interposed between said 0 pulses, with a repetitive period $\tau$ equal to a length of time required for a one bit shift (see FIG. 2A). Conversely, the second clock gate $G_2$ is supplied with clock pulses $\phi_p$ consisting of pulses of grounding voltage representing a binary 1 and pulses of negative voltage denoting a binary digit 0 disposed between 1 pulses, with a repetitive period $\tau$ equal to a length of time required for a one bit shift (see FIG. 2B).

There will now be described the operation of a shift register arranged as shown in FIG. 1 by reference to a concrete timing diagram given in FIGS. 2A to 2G.

Let us take an example where the input terminal $I_n$ is impressed with data represented by a binary 0 of the positive logic. When the first clock gate $G_1$ is supplied with the 0 pulse included in the clock pulses $\phi_n$ shown in FIG. 2A, then the first coupling IGFET 13P is turned on to cause a gate capacitance $C_f$ across the input $I_f$ of the forward half shift gate 11 and its grounding point to be rapidly charged to a 0 level through the actuated IGFET 13P (See FIG. 2D. Where charging has already been made to the 0 level, this charged condition is sustained.). Since the P channel IGFET 11P of the forward half shift gate 11 is rendered conductive, the output $O_f$ of said gate 11 is brought to a grounded condition, that is, to a binary 1 (See FIG. 2E). When, under such condition, the gate of the second coupling IGFET 14N is supplied with a 1 pulse included in the clock pulses $\phi_n$ shown in FIG. 2A, then said IGFET 14N is rendered conducting to cause a gate capacitance $C_r$ across the input $I_r$ of the rear half shift gate 12 and ground to be quickly discharged through said actuated IGFET 14N. (See FIG. 2F. Where said capacitance has already been discharged, said condition is maintained.) Since the input $I_r$ of the rear half shift gate 12 is brought to the state of a binary 1 and the N channel IGFET 12N of said gate 12 is rendered conductive, the output $O_r$ thereof is brought to the state of a binary 0. Thus the input data 0 supplied to the input terminal $I_n$ is drawn out from the output terminal $O_r$ of a shift register unit after a one bit interval. Similarly, the input data 1 supplied to the input terminal $I_n$ is obtained from said output terminal $O_r$ after a one bit interval.

In this case, the first and second coupling IGFET's 13P and 14N have the source-drain paths connected in series between the outputs of the respective preceding shift gates and the input of the corresponding following shift gates, thereby acting as a sort of switching element for transmitting outputs from the preceding shift gate to the inputs of the following shift gate under the control of the clock pulses supplied to said gates. In contrast, the third coupling IGFET 15N has its source-drain path connected in parallel between the input $I_f$ of the forward half shift gate 11 and the output $O_r$ of the rear half shift gate 12 always having the same phase as seen from FIG. 2. The gate $G_2$ of said third coupling IGFET 15N is impressed with a 1 pulse included in the clock pulses $\phi_p$ shown in FIG. 2B to be rendered conducting, causing the condition of the output terminal $O_r$ to be positively fed back to the input terminal $I_f$. The resulting condition of said input terminal $I_f$ is always maintained in the form of direct current per unit section, thereby enabling the subject shift register to act as the so-called static type.

The prior art shift register shown in FIG. 1 has the half shift gate respectively formed of a complementary pair of one P channel and one N channel IGFET's one, so that as compared with any of the preceding types in which the shift gate includes IGFET's acting as a load resistance, the shift register of FIG. 1 indeed has the advantages of not only reducing power consumption, but also improving the symmetry of the electrical and physical arrangement. However, the overall electrical and physical arrangement of IGFET's used still remains appreciably unsymmetrical due to the inclusion of the aforementioned coupling IGFET's 13P, 14N and 15N, resulting in the drawback of obstructing not only the compact arrangement of IGFET's but also their plain layout.

Assuming that a threshold voltage of 4 volts (an absolute value) should generally be impressed on the gate of IGFET's for operation (this holds true with both P and N channel IGFET's), it will be necessary to supply the gate with a voltage about twice said threshold voltage, that is, about 8 volts and the power source with a voltage about 2.5 times said threshold voltage, that is, about 10 volts in order to operate IGFET in a saturated condition.

In the circuit arrangement of FIG. 1, however, the coupling IGFET's 13P, 14N and 15N display the later described source follower mode (or back gate bias mode). Referring to the second coupling IGFET 14N, where the P channel IGFET 11P of the forward half shift gate 11 is fully conducting and the gate $G_1$ is impressed with a 1 pulse included in the clock pulses $\phi_p$ of FIG. 2B to actuate said second coupling IGFET 14N, then the input $I_r$ of the rear half shift gate 12 is not supplied with a desired grounding voltage, but with a voltage decreased by that extent corresponding to the threshold voltage of said second coupling IGFET 14N. Accordingly, the input gate voltage for the saturated operation of the coupling IGFET's 13P, 14N and 15N has to be increased to about twice the previously mentioned 8 volts, that is, about 16 volts. The shift register of FIG. 1 requires two kinds of voltage, that is, −10 volts for the negative power source −V and −16 volts for a source of clock pulses, and is not desirable from the standpoint of effectively utilizing the IC techniques. If the negative power source −V is allowed to have the same voltage of −16 volts as the source of clock pulses, there may be used a single power source. However, this will unnecessarily increase power consumption and be similarly unfavorable for utmost application of the IC techniques.

This invention has been accomplished in view of the above-mentioned circumstances and is intended to provide a static shift register using IGFET's most suitable for IC which not only permits the use of a single power source without substantially increasing wasteful power consumption but also can attain the most ideal symmetry of the entire electrical as well as physical arrangement of IGFET's.

According to this invention, there is provided a static shift register using IGFET's and formed of a plurality of shift register units cascade connected to each other, one of two halves of each said shift register unit comprising a main shift gate including a main shift gate section having a gate to which a preset data consisting of a series of binary digits 1 and 0 is supplied and a clock gate section having a gate on which clock pulses are impressed, an inverter connected in series to the output of the main shift gate section, and an auxiliary shift gate including a shift gate section with its input coupled to the output of the inverter and with its output coupled to the input of the inverter and a clock gate section having a gate on which clock pulses with a reverse phase to that of said clock pulses for the main clock gate section; and the other shift register unit half comprising at least a main shift gate having substantially the same construction as that of said one shift register unit half, wherein said main shift gate section and clock gate section, said inverter, and auxiliary shift gate section and clock gate section are all arranged by paired IGFET's each having one P channel and one N channel and connected in complementary relationship.

This invention can be more fully understood from the following detailed description when taken in conjunction with reference to the accompanying drawings, in which.

Figure 1:
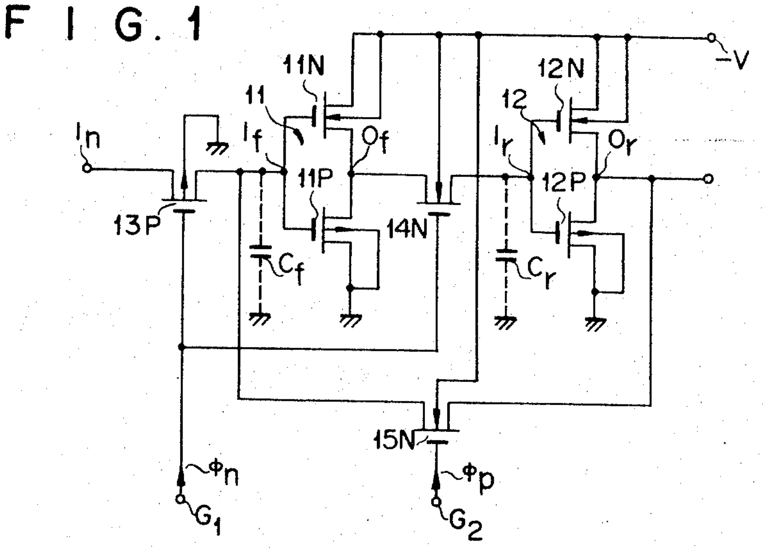
PRIOR ART FIG. 1
FIG. 1 is a circuit diagram of a typical example of a prior art static shift register unit using IGFET's.
Figures 2A, 2B, 2C, 2D, 2E, 2F, 2G:
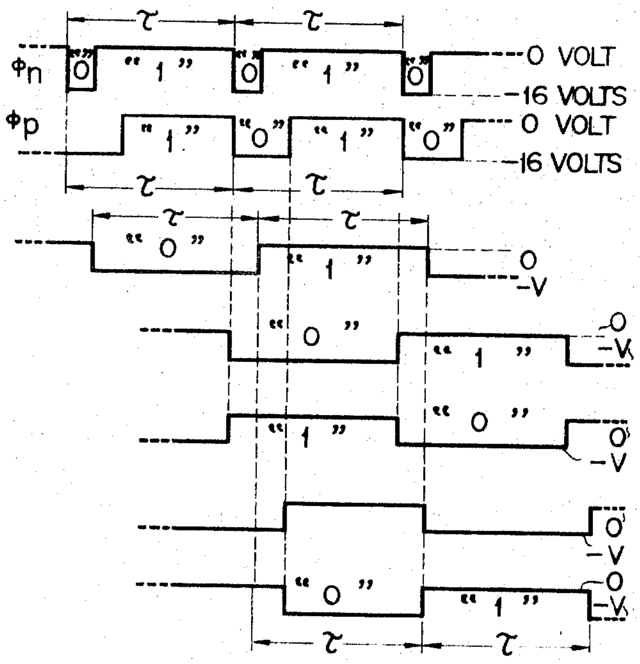
FIGS. 2A–2G shows the operation timing waveforms of the various sections of the circuit of FIG. 1.
Figure 3:
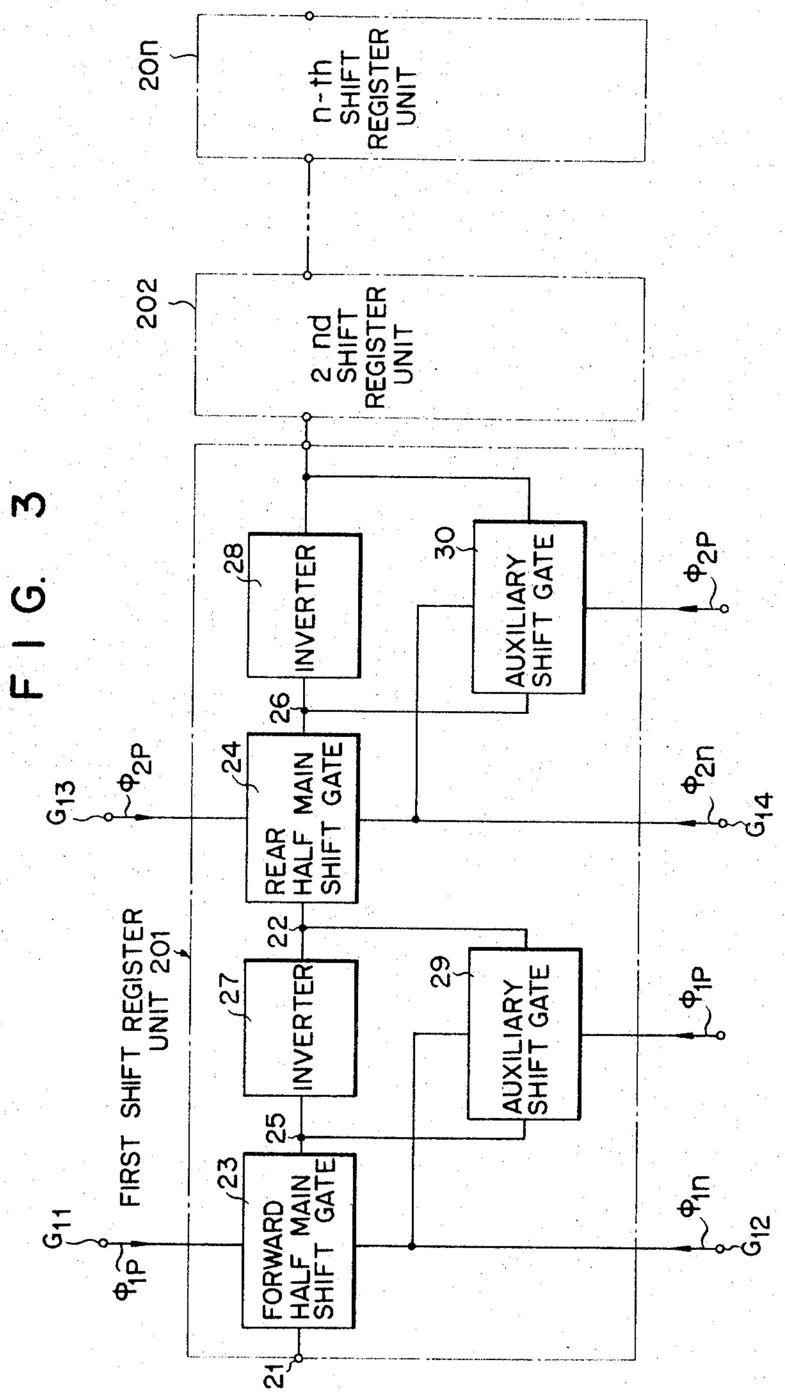
FIG. 3 is a schematic circuit diagram of a static shift register using IGFET's according to an embodiment of the invention.
Figure 4:
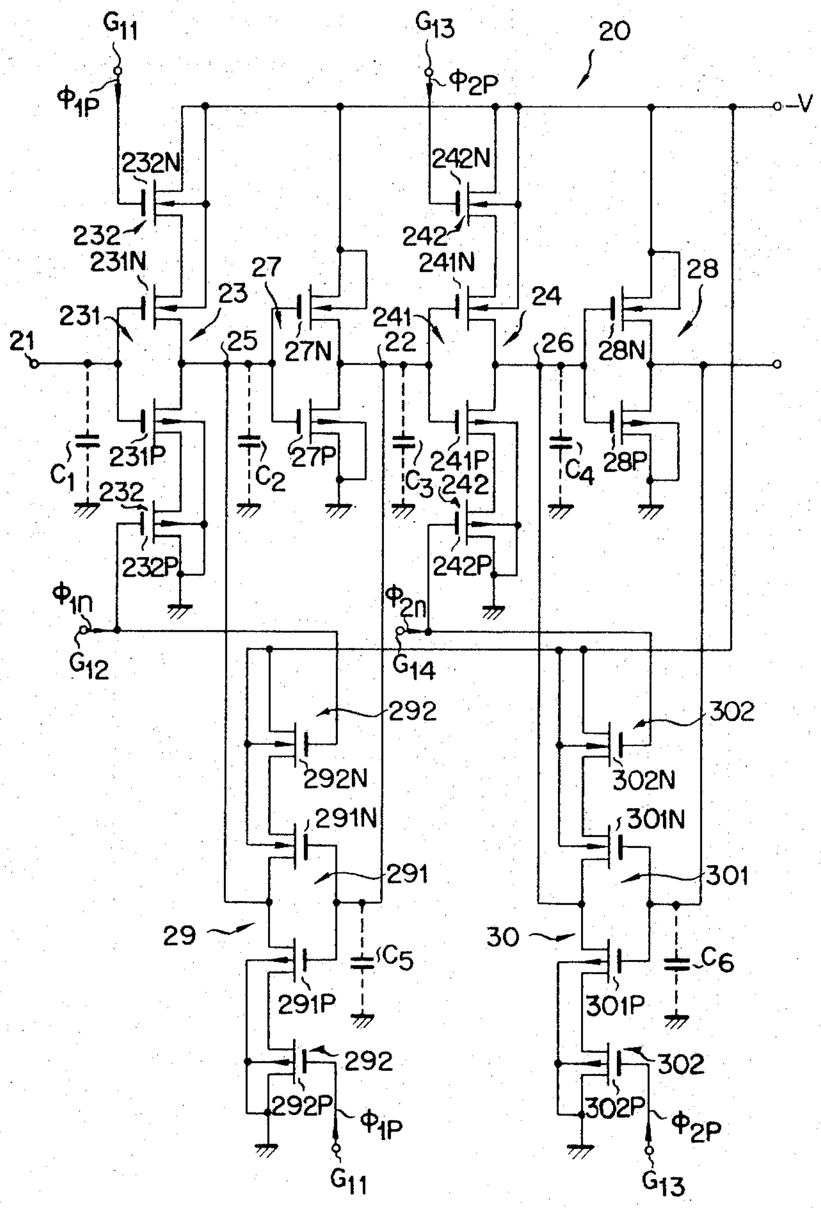
FIG. 4 represents a practical circuit arrangement of each shift register unit of FIG. 3.
Figure 6:
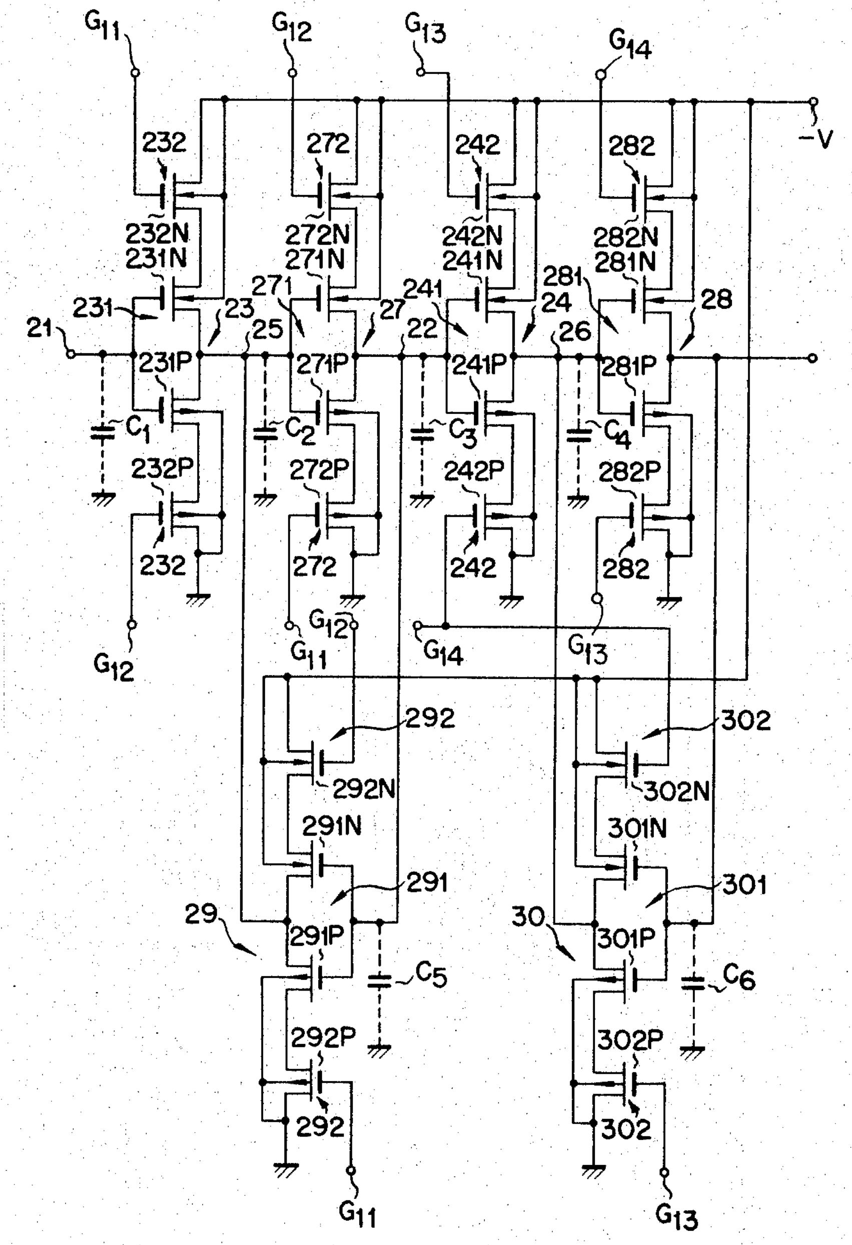
Figure 7:
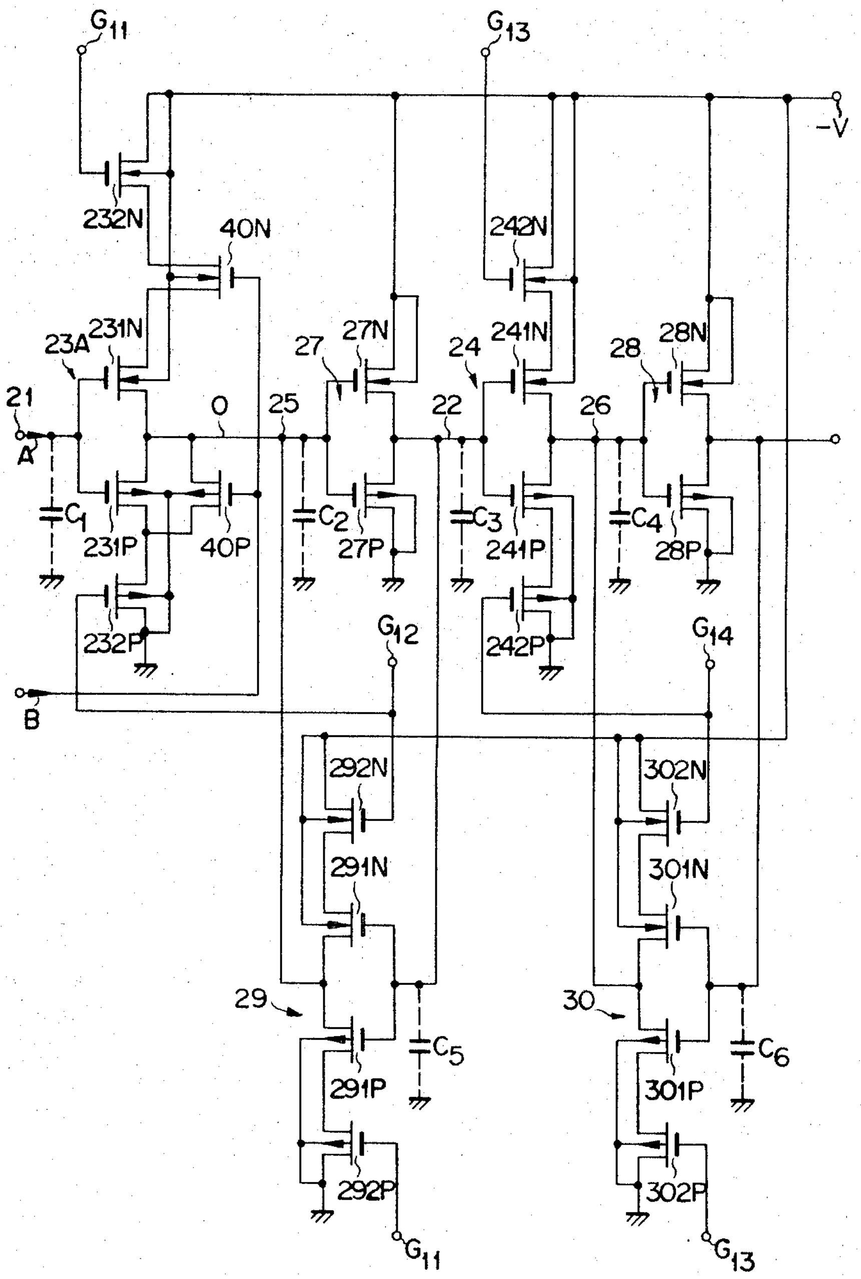
Figure 8:
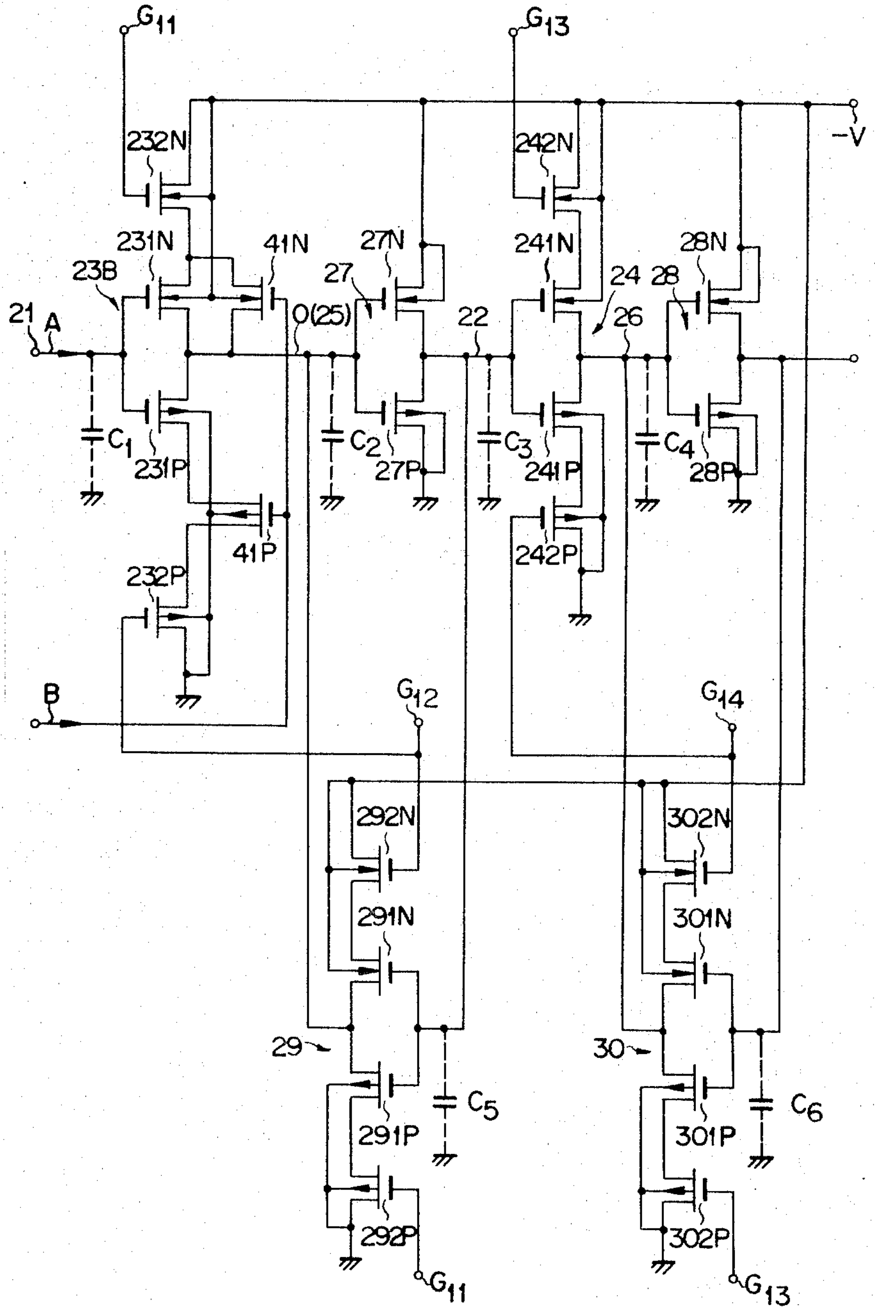
Figure 9:
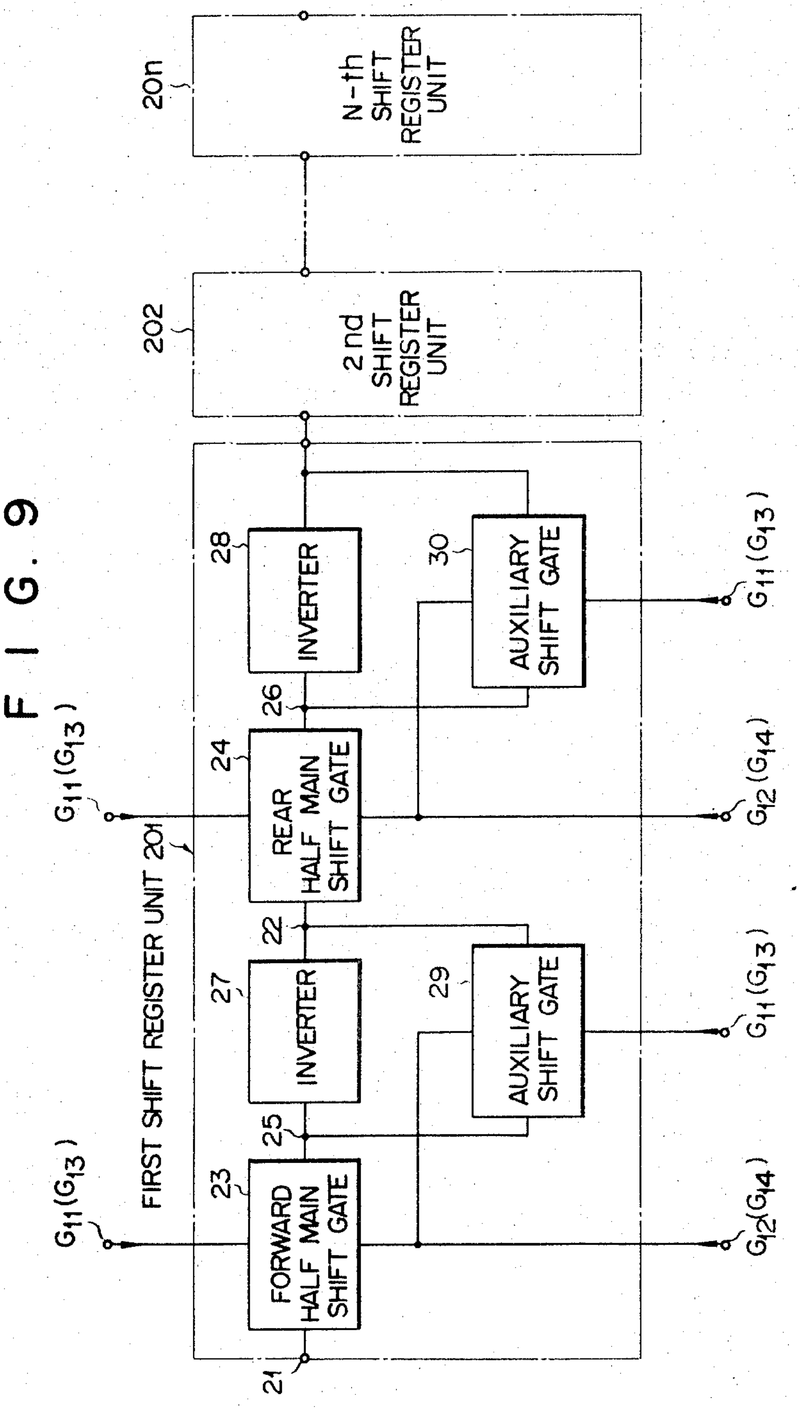
Figures 10A, 10B, 10E, 10F, 10G, 10H, 10I, 10J, 10K, 10L, 10M:
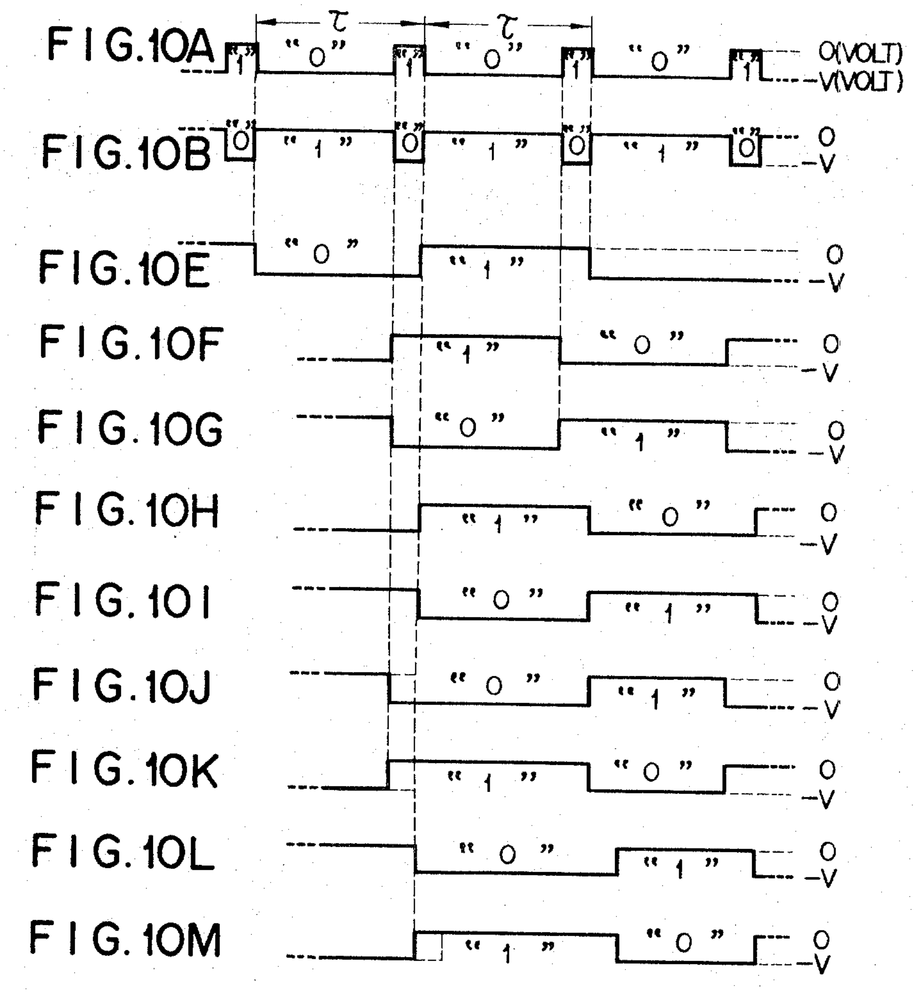
Figure 11:
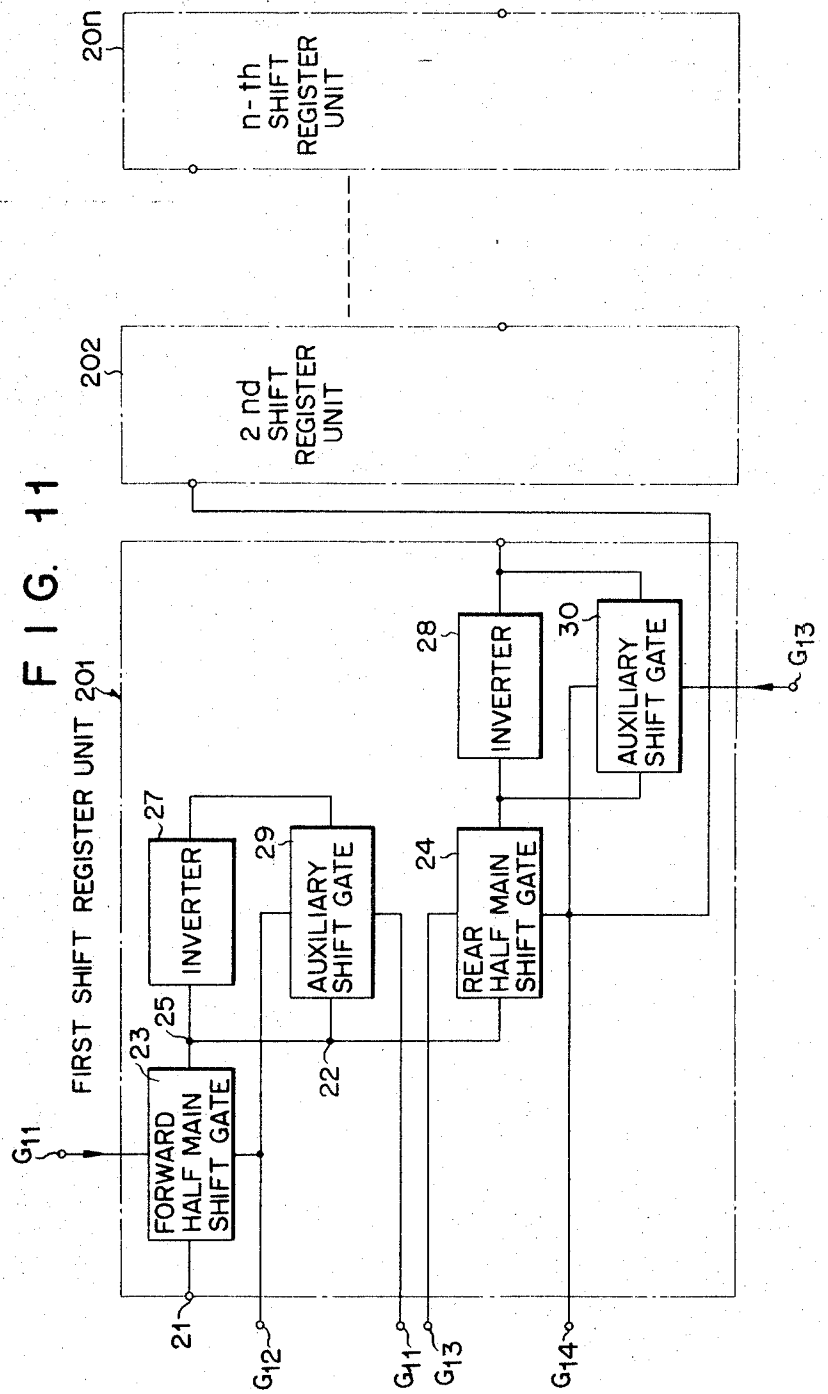
Figure 12:
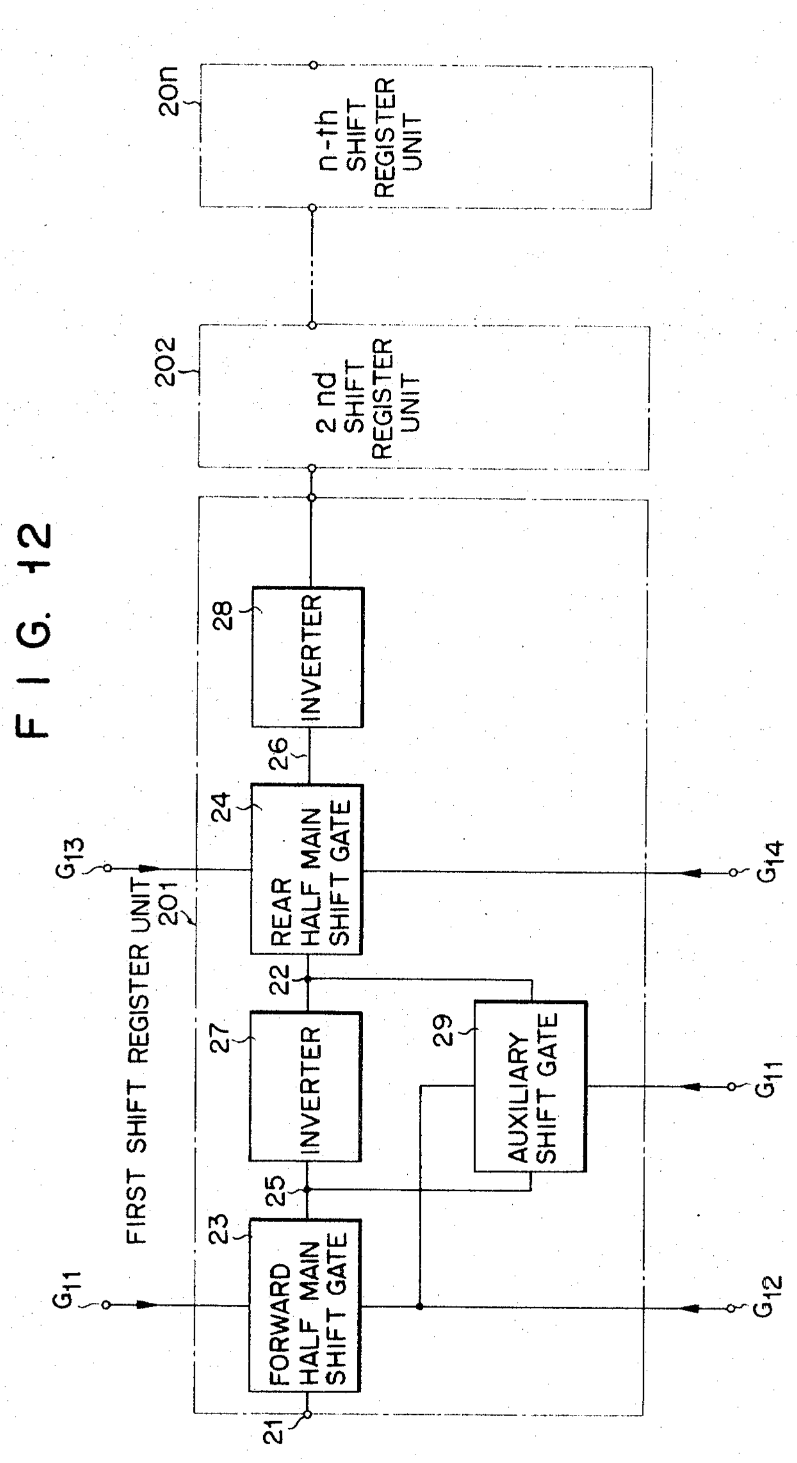
Figure 13:
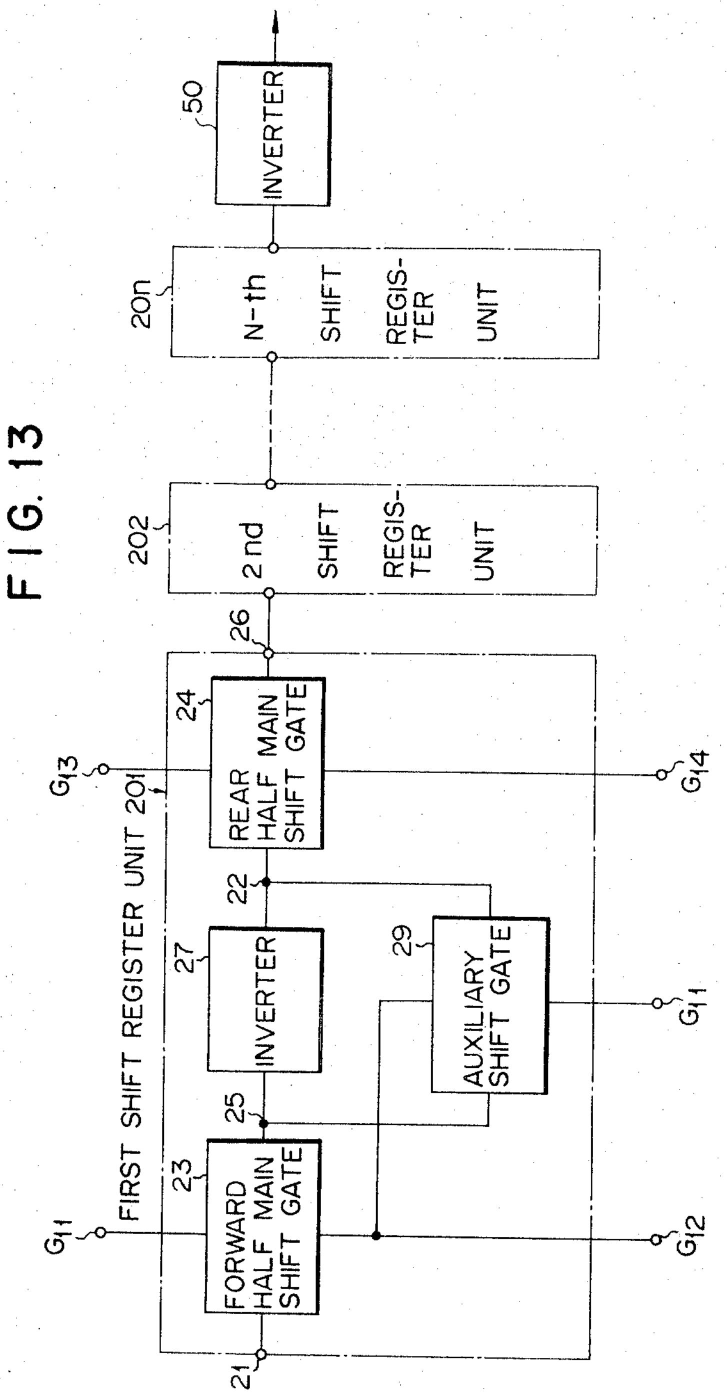

FIGS. 5A to 5M indicate the operation timing waveforms of the various sections of the circuit of FIG. 4;

FIGS. 6 to 8 are the circuit diagrams of static shift registers using IGFET's according to other embodiments of the invention;

FIG. 9 is a schematic circuit diagram of a modification of FIG. 3;

FIGS. 10A to 10M indicate the operation timing waveforms of the various sections of the circuit of FIG. 9; and FIGS. 11 to 13 are the schematic circuit diagrams of other modifications of FIG. 3.

There will now be described by reference to the appended drawings a static shift register using IGFET's according to the preferred embodiments of this invention. FIG. 3 is a schematic circuit diagram of such shift register according to an embodiment of the invention. According to the embodiment of FIG. 3, shift register units **201, 202 . . . 20*n* having the same later described circuit arrangement are cascade connected in a number corresponding to the desired number of units. Referring to the circuit arrangement of only the first stage shift register unit 201, the front and rear half unit portions have the same circuit arrangement. The respective half bit portions comprise main shift gates 23 and 24 for conducting the later described binary coded signals or characters 1 and 0 which are impressed on the inputs 21 and 22 to the respective outputs 25 and 26 under control of the later described paired clock pulses $\phi_{1p}$—$\phi_{1n}$ and $\phi_{2p}$—$\phi_{2n}$ supplied in inverted phases; inverters 27 and 28 connected to the outputs 25 and 26 of the main shift gates 23 and 24; and auxiliary shift gates 29 and 30 parallel connected between the input and output terminals of the corresponding inverters 27 and 28 so as to maintain outputs from the corresponding main shift gates 23 and 24 in the form of direct current per unit portion under control of said paired clock p pulses $\phi_{1p}$—$\phi_{1n}$ and $\phi_{2p}$—$\phi_{2n}$, thereby causing the main shift gates 23 and 24** to function statistically. All the aforementioned main shift gates, inverters and auxiliary shift gates are formed of complementary pairs of P AND N channel IGFET's.

FIG. 4 are practical circuit arrangements of the various sections of the first shift register unit 201 shown in FIG. 3. The main shift gates 23 and 24 comprise shift gate sections 231 and 241 consisting of paired enhancement type IGFET's 231P-231N and 241P-241N one P channel and one N channel wherein the gates of said IGFET's are jointly connected to the corresponding input terminals 21 and 22 and the drains thereof are jointly connected to the corresponding output terminals 25 and 26; and clock gate sections 232 and 242 similarly consisting of paired enhancement type IGFET's 232P-232N and 242P-242N wherein the drains of the P channel IGFET's 232P and 242P are connected to the sources of the P channel IGFET's 231P and 241P of the main shift gate sections 231 and 241 and the sources of said P channel IGFET's 232P and 242P are connected to ground, and the drains of the N channel IGFET's 232N and 242N are connected to the sources of the N channel IGFET's 231N and 241N of the shift gate sections 231 and 241 and the sources of said N channel IGFET's 232N and 242N are connected to a negative power source −V.

The substrate electrodes of the P channel IGFET's are all connected to ground, and those of the N channel IGFET's are all connected to the negative bias power source −V.

Figures 5A, 5B, 5C, 5D, 5E, 5F, 5G, 5H, 5I, 5J, 5K, 5L, 5M:
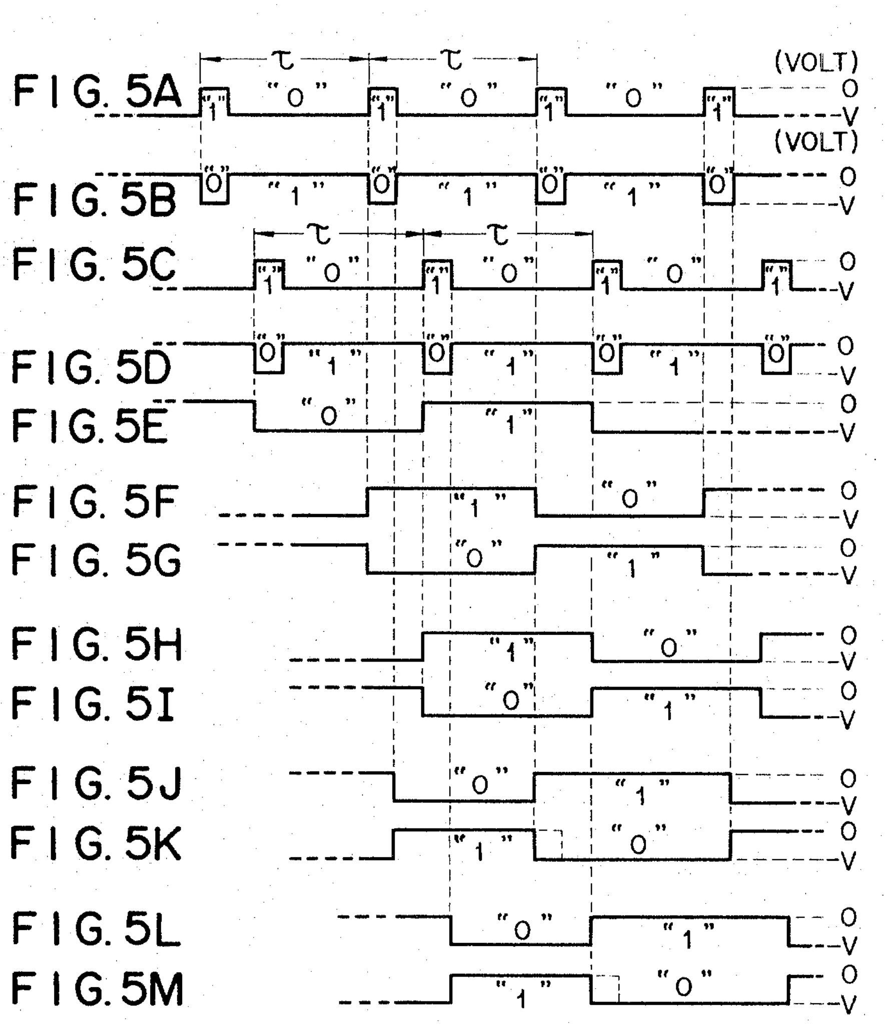

In this case, the input terminal 21 is impressed with preset binary coded signals 1 and 0 shown in FIG. 5E at a time interval $\tau$ required for a one bit shift.

The gate $G_{11}$ of the N channel IGFET 232N of the forward half clock gate section 232 is supplied with clock (or shift) pulses $\phi_{1p}$ consisting of pulses normally of grounding voltage representing a binary 1 and pulses of appropriate negative voltage denoting a binary 0 interposed between said 1 pulses, with a repetitive period $\tau$ equal to a length of time required for a one bit shift as shown in FIG. 5A, and the gate $G_{12}$ of the P channel IGFET 232P of the clock gate section 232 is impressed with clock pulses $\phi_{1n}$ having a phase inverted with respect to that of the aforesaid clock pulses $\phi_{1p}$ as shown in FIG. 5B.

The gate $G_{13}$ of the N channel IGFET 242N of the rear half clock gate section 242 is supplied with clock pulses $\phi_{2p}$ consisting of pulses of grounding voltage representing a binary 1 and pulses of appropriate negative voltage denoting a binary 0 disposed between said 1 pulses, with a repetitive period $\tau$ equal to a length of time required for a one bit shift as shown in FIG. 5C, and the gate $G_{14}$ of the P channel IGFET 242P of said clock gate section 242 is impressed with clock pulses $\phi_{2N}$ having an inverted phase to that of the aforementioned clock pulses $\phi_{2p}$ as indicated in FIG. 5D. It will be apparent, therefore, that the paired P and N channel IGFET's 231P-231N and 241P-241N constituting the main shift gate sections 231 and 241 and the paired P and N channel IGFET's 232P-232N and 242P -242N constituting the clock gate sections 232 and 242 are respectively arranged in complementary symmetry circuit relationship.

The inverters 27 and 28 have the sources of P channel IGFET's 27P and 28P directly grounded and the sources of N channel IGFET's 27N and 28N directly connected to the negative bias power source −V, but in other respects have the same arrangement of the shift gate sections 231 and 241. Like the paired IGFET's 231P-231N and 241P-241N, the paired IGFET's 27P-27N and 28P-28N constituting said inverters 27 and 28 are connected in complementary circuit relationship.

In the auxiliary shift gates 29 and 30, the input terminals of the shift gate sections 291 and 301 thereof are connected to the output terminals of the corresponding inverters 27 and 28 and the output terminals of said auxiliary shift gate sections 291 and 301 are connected to the input terminals of the corresponding inverters 27 and 28. Clock pulses are impressed on the clock gate sections 292 and 302 of the aforementioned auxiliary shift gates 29 and 30 exactly reverse to the case of the clock gate sections 232 and 242 of the main shift gates 23 and 24, that is, the gates of the N channel IGFET's 292N and 302N of said auxiliary clock gate sections 292 and 302 are supplied with the same clock pulses as those impressed on the gates of the P channel IGFET's 232P and 242P of the clock gate sections 232 and 242 of the main shift gates 23 and 24 and the gates of P channel IGFET's 202P and 302P of said auxiliary shift gate sections 292 and 302 are supplied with the same clock pulses as those impressed on the gates of the N channel IGFET's 232N and 242N of the clock gate sections 232 and 242 of the main shift gates 23 and 24. In other respects, the auxiliary shift gates 29 and 30 have the same arrangement as the main shift gates 23 and 24. Thus the paired IGFET's 291P-291N, 292P-292N, 301P-301N and 302P-302N of said auxiliary shift gates 29 and 30 are respectively arranged in complementary circuit relationship.

There will now be described the operation of a shift register arranged as shown in FIG. 4 according to an embodiment of this invention by reference to the concrete operation timing diagrams of the various circuit sections illustrated in FIGS. 5A to 5M.

When the input terminal 21 is supplied with data represented by a binary 0 of the positive logic shown in FIG. 5E, then a gate capacitance $C_1$ prevailing across the input terminal of the forward half main shift gate section 231 and ground is charged with voltage corresponding to the binary 0. When, under this condition, the gate of the P channel IGFET 232P of the forward half main clock gate section 232 is supplied with a 0 pulse included in the clock pulses $\phi_{1p}$ of FIG. 5B, the P channel IGFET 231P of the main shift gate section 231, together with the IGFET 232P, is rendered conducting causing the output terminal 25 of the main shift gate 23 to be brought to a state of binary 1 (See FIG. 5F). As a result, the gate capacitance $C_2$ prevailing across the input terminal of the forward half inverter 27 and ground is discharged through the actuated P channel IGFET's 231P and 232P thereby actuating the N channel IGFET 27N of the inverter 27 and consequently bringing the output terminal to a state of binary 0 (See FIG. 5G). As a result, a gate capacitance $C_3$ prevailing across the input terminal of the rear half shift gate section 241 and ground is charged with voltage corresponding to the binary 0. When, under this condition, the gate $G_{14}$ of the P channel IGFET 242P of the rear half clock gate section 242 is impressed with a 0 pulse included in the clock pulses $\phi_{2n}$ shown in FIG. 5D, then said IGFET 242P and consequently the P channel IGFET 241P of the shift gate section 241 are actuated to bring the output terminal of the rear half shift gate 24 to a state of binary 1 (See FIG. 5H). Accordingly, a gate capacitance $C_4$ prevailing across the input terminal of the rear half inverter 28 and ground is discharged through the actuated P channel IGFET's 241P and 242P, thereby actuating the N channel IGFET 28N of said rear half inverter 28 and consequently bringing the output terminal of said inverter, that is, the output terminal of the corresponding shift register unit 20 to a state of binary 0 (See FIG. 5I).

Thus the input data supplied to the input terminal 21 of said shift register unit 20 is conducted to its output terminal after a one bit interval.

When the output terminal of the forward half inverter 27 is brought to a state of 0 (the input terminal presents a state of 1 ), then there is discharged a gate capacitance $C_5$ prevailing across the input terminal and grounding point of the forward half auxiliary shift gate section 291 (See FIG. 5J). When, under this condition, the gate of the N channel IGFET 292N of the forward half clock gate section 292 is supplied with a 0 pulse included in the clock pulses $\phi_{1n}$ shown in FIG. 5B, then the IGFET 292N and consequently the N channel IGFET 291N of the auxiliary shift gate section 291 are actuated, thereby causing the output terminal of the forward half auxiliary shift gate 29 to be set at a state of 1 (See FIG. 5K). While, therefore, the input terminal 21 of the shift register unit 20 is supplied with data of 0, the forward half auxiliary shift gate 29 maintains the output terminal of the forward half main shift gate 23, namely, the input terminal of the forward half inverter 27 in the form of direct current, thereby controlling the forward half shift register unit for its static operation. The aforementioned relationship also holds true of the case where the input terminal 21 of said shift register unit 20 is supplied with 1 data.

When the output terminal of the rear half inverter 28 is set at a state of 0 (the input terminal presents a state of 1), then there is discharged a gate capacitance $C_6$ prevailing across the input terminal and grounding point of the rear half auxiliary shift gate section 301 (See FIG. 5L). When, under this condition, the gate of the N channel IGFET 302N of the rear half clock gate section 302 is impressed with a 0 pulse included in the clock pulses $\phi_{2n}$ shown in FIG. 5D, then said IGFET 302N and consequently the N channel IGFET 301N of the auxiliary shift gate section 301 are rendered conducting, thereby bringing the output terminal of the rear half auxiliary shift gate 30 to a state of binary 1 (See FIG. 5M).

Like the forward half auxiliary shift gate 29, therefore, the rear half auxiliary shift gate 30 maintains the output terminal of the rear half main shift gate 24, that is, the input terminal of the rear half inverter 28 in the form of direct current per one bit interval of input data, thereby controlling the rear half shift register unit for its static operation.

When the input terminal 21 of the shift register unit 20 is supplied with 1 data, the relationship of the actuated IGFET's of the main shift gates, the inverters and the auxiliary shift gates is exactly reversed from the case where said input terminal is impressed with 0 data, that is, the N channel IGFET's are rendered conducting in place of the P channel IGFET's or vice versa. In other respects, the shift register unit 20 performs the same operation as in the case of said 0 data. Therefore, the 1 data supplied to the input terminal 21 of the shift register unit 20 is conducted to its output terminal after a one bit interval.

The shift register of this invention arranged as described above does not include coupling IGFET's which rendered the electrical as well as physical arrangement of IGFET's undesirably unsymmetrical, but comprises complementary pairs enhancement type P and N channel IGFET's, thereby enabling, as seen from FIG. 4, IGFET's to be electrically as well as physically arranged in an ideal symmetrical pattern, thus offering the advantage of permitting the most compact assembly of IGFET's. Further, due to absence of the aforesaid coupling IGFET's which present a source follower mode, the gate voltage for the saturated operation of IGFET's is only required to be about 8 volts with the threshold voltage thereof taken to be about 4 volts, making it possible to set the voltage of the negative power source −V at about 10 volts.

Further, with the shift register of this invention, the voltage of the negative power source −V can be concurrently used as the source voltage of the 0 portion of the clock pulses $\phi_{1p}$, $\phi_{1n}$, $\phi$2p and 100 $_{2n}$ (for the 1 portion the grounding voltage is used), thus facilitating the adoption of a single source power supply system.

A shift register according to the embodiment of FIG. 4 is still undesirable in that when it is attempted to control the main shift gate sections 231 and 241 and the auxiliary shift gate sections 291 and 301 only by signals supplied to the gates thereof, either group of the P and N channel IGFET's is brought from an inoperable to an operable state and the other group conversely from an operable to an inoperable state, with the result that during the switching operation, both P and N channel IGFET's have a simultaneously operable moment. If, however, the P and N channel IGFET's of the main and auxiliary shift gate sections are controlled through the corresponding clock gate sections 232, 242, 292 and 302, then the paired P and N channel IGFET's of not only these clock gate sections but also the main and auxiliary shift gate sections are prevented from being brought to an operable state at the same moment as described above, thereby always enabling either group of the IGFET's to be converted to an opposite state to the other under control of clock pulses impressed on the clock gate sections, that is, by the so-called clock synchronization system. However, the inverters 27 and 28 alone of FIG. 4 lack clock gate sections and consequently are operated by a non-clock synchronization system. According to the embodiment of FIG. 6, therefore, the inverters 27 and 28 are provided with clock gate sections 272 and 282 having the same construction as the clock gate sections 232 and 242 of the main shift gates 24 and 24, that is, consisting of complementary pairs of P and N channel IGFET's 272P-272N and 282P-282N, so as to be operated by the clock synchronization system like the main and auxiliary shift gates.

While the shift registers of FIGS. 4 and 6 are so designed as to be operated with a single input, those of FIGS. 7 and 8 have functions of NAND/NOR and NOR/NAND so as to be operated with multi-inputs (only two inputs are indicated for briefness).

Referring to FIG. 7, a forward half shift gate 23A comprises a P channel IGFET 40P whose drain-source path is connected in parallel to that of the IGFET 231P; and an N channel IGFET 40N whose drain-source path is connected in series between the source of the IGFET 231N and the drain of the IGFET 232N. The common gate of these IGFET's 40P and 40N is impressed with binary coded signals 1 and 0 (designated as B) like the input data (designated as A) supplied to the input terminal 21.

The relationship of output (designated as O) obtained from the output terminal of the forward half shift gate 23A of the shift register unit of FIG. 7 and the aforementioned two inputs A and B is indicated in truth values in Tables 1 and 2 below with respect to the positive and negative logic respectively.

Table 1 (NAND)

| A | B | 0 (positive logic) |
|---|---|---|
| 0 | 0 | 1 |
| 0 | 1 | 1 |
| 1 | 0 | 1 |
| 1 | 1 | 0 |

2 (NOR)

| A | B | 0 (negative logic) |
|---|---|---|
| 0 | 0 | 1 |
| 0 | 1 | 0 |
| 1 | 0 | 0 |
| 1 | 1 | 0 |

Accordingly, the shift register unit of FIG. 7 has a function of NAND in which a relationship of $\overline{A \times B}=0$ between the two inputs and the resulting output exists in terms of the positive logic, and also a function of NOR in which a relationship of $\overline{A+B}=0$ exists in terms of the negative logic.

Referring to FIG. 8, a forward half shift gate 23B comprises a N channel IGFET 41N whose drain-source path is connected in parallel to that of the IGFET 231N; and a P channel IGFET 41P whose drain-source path is connected in series between the source of the IGFET 231P and the drain of the IGFET 232P. The common gate of these IGFET's 41P and 41N is impressed with binary coded signals 1 and 0 like the input data (denoted as A) supplied to the input terminal 21.

The relationship of output (indicated as 0) obtained from the output terminal of the forward half shift gate 23B of the shift register unit of FIG. 8 and the two inputs A and B is presented in truth values in Tables 3 and 4 below in connection with the positive and negative logic.

Table 3 (NOR)

| A | B | o (positive logic) |
|---|---|---|
| 0 | 0 | 1 |
| 0 | 1 | 0 |
| 1 | 0 | 0 |
| 1 | 1 | 0 |

Table 4 (NAND)

| A | B | 0 (negative logic) |
|---|---|---|
| 0 | 0 | 1 |
| 0 | 1 | 1 |
| 1 | 0 | 1 |
| 1 | 1 | 0 |

Therefore, the shift register unit of FIG. 8 performs, conversely to that of FIG. 7, a function of NOR in which a relation ship of $\overline{A+B}=0$ between the two inputs and the resulting output, exists in terms of the positive logic a relationship of $\overline{A+B}=0$ between the two inputs and the resulting output, and also a function of NAND in which a relationship of $\overline{A \times B}=0$ exists in terms of the negative logic.

FIG. 9 is a modification of FIG. 3 (or FIG. 4). According to the shift register of FIG. 3, control was effected by separate clock pulses having four phases, that is, clock pulses having two phases $\phi_{1p}$ and $\phi_{1n}$ for the forward half shift gate section of the shift register units 201 to 20*n* and clock pulses having two phases $\phi_{2p}$ and $\phi_{2n}$ for the rear half shift gate section. However, it will be apparent from FIG. 9 that said control may be carried out using either of the aforesaid two groups of clock pulses of $\phi_{1p}$—$\phi_{1n}$ and $\phi_{2p}$—$\phi_{2n}$ for the forward and rear half shift gate sections alike. Moreover, this arrangement has the advantage of further elevating the electrical symmetry of IGFET's.

FIGS. 10 A to 10M are concrete operation timing diagrams of the various circuit sections of FIG. 9 corresponding to FIGS. 5A to 5M. As seen from FIG. 10, the input data consisting of a series of binary coded signals 1 and 0 is conducted to the output terminal of the shift register unit after a one bit interval as in the circuit of FIG. 3.

FIG. 11 is another modification of FIG. 3. In the shift register of FIG. 3, the input terminal of the rear half main shift gate of the shift register units 201 to 20*n* was supplied with output from the corresponding forward half inverter 27. In the circuit of FIG. 11, however, the input terminal of the rear half main shift gate is supplied with input from the corresponding forward half inverter 27. The modification of FIG. 11 is different from the preceding ones only in that data supplied to the input terminal of the shift register unit always has a reverse phase to that obtained from its output terminal and, in other respects, is operated in the same way.

FIG. 12 is still another modification of FIG. 3. According to this modification, the auxiliary shift gate 30 is eliminated from the rear half shift register unit or (permissibly forward half shift register unit). With a shift register of such arrangement, the forward half shift register unit performs a static operation, whereas the rear half shift register unit carries out the so-called dynamic operation. In other respects, the shift register of FIG. 12 is operated in the same manner as the preceding embodiments.

FIG. 13 is a further modification of FIG. 3. In this case, there are eliminated not only the auxiliary shift gate but also the inverter from the rear half shift register unit or (permissibly forward half shift register unit). With the shift register of such arrangement, the forward half shift register unit performs a static operation, whereas the rear half shift register unit carries out a dynamic operation as in FIG. 12 and data supplied to the input and output terminals of the shift register unit is always reversed in phase. In other respects, the shift register of FIG. 13 makes the same operation as the preceding embodiments.

Numeral 50 in FIG. 13 denotes an inverter provided, if necessary, to cause output from the final shift register unit 20n to have a phase the same as or reverse to that of input supplied to the input terminal of the first shift register unit 201.

What is claimed is:

1. A static shift register formed of a plurality of cascade arranged shift register units, one of two halves of each said shift register unit comprising a main shift gate which includes a main shift gate section having an input to which binary coded signals are applied and a main clock gate section having a gate on which a pair of clock pulses inverted in phase from each other for shifting the data signals stored in said main shift gate section to a succeeding shift gate section are impressed, an inverter having the input connected to said main shift gate section output, and an auxiliary shift gate which includes an auxiliary shift gate section having the input and output connected to the output and input of said inverter and an auxiliary clock gate section having a gate on which clock pulses with inverted phases to those of the paired clock pulses for said main clock gate section are impressed; and the other shift register unit half comprising at least a main shift gate which includes a main shift gate section having an input to which output binary coded signals from said one shift register unit half are applied and a main clock gate section having a gate on which a pair of clock pulses inverted in phase from each other for shifting the data signals stored in said associated main shift gate section to a succeeding shift gate section are impressed, the improvement being that said both main shift gate sections, said both main clock gate sections, said inverter, said auxiliary shift gate section and said auxiliary clock gate section each comprise a complementary pair of insulated gate enhancement type field effect transistors.

2. A shift register according to claim 1 wherein said main shift gate section comprises a first complementary pair of P channel and N channel IGFET's having the gates connected together to a corresponding input to be supplied with the binary coded signals and having the drains connected together to the input of said associated inverter or a succeeding main shift gate section; and said main clock gate section comprises a second complementary pair of IGFET's constituted by a second P channel IGFET having the drain-source path connected between the source of said first P channel IGFET and a positive power source and having the gate impressed with a clock pulse of a predetermined phase, and a second N channel IGFET having the drain-source path connected between the source of said first N channel IGFET and a negative power source and having the gate impressed with a clock pulse of an inverted phase to that of said clock pulse to be impressed on the gate of said second P CHANNEL IGFET.

3. A shift register according to claim 1 wherein said inverter comprises a third complementary pair of P and N channel IGFET's having the gates as well as the drains connected together, the source of said P channel IGFET being connected to a positive power source and the source of said N channel IGFET being connected to a negative power source.

4. A shift register according to claim 3 wherein said inverter comprises not only the inverter section which includes said third complementary pair of P and N channel IGFET's, but also a clock gate section which includes a fourth complementary pair of IGFET's constituted by a fourth P channel IGFET having the drain-source path connected between the source of said third P channel IGFET and said positive power source; and a fourth N channel IGFET having the drain-source path connected between the source of said third N channel IGFET and said negative power source, the gates of said fourth P and N channel IGFET's being impressed with clock pulses having respective inverted phases to those of said clock pulses to be impressed on the gates of said second P and N channel IGFET's included in said associated main clock gate section.

5. A shift register according to claim 1 wherein said auxiliary shift gate section comprises a fifth complementary pair of P channel and N channel IGFET's having the gates connected together to the output of said associated inverter and having the drains connected together to the input of said associated inverter; and said auxiliary clock gate section comprises a sixth complementary pair of IGFET's constituted by a sixth P channel IGFET having the drain-source path connected between the source of said fifth P channel IGFET and a positive power source; and a sixth N channel IGFET having the drain-source path connected between the source of said fifth N channel IGFET and a negative power source, the gates of said sixth P and N channel IGFET's being impressed with clock pulses having phases inverted with respect to those of said clock pulses to be impressed on the gates of said associated main clock gate section.

6. A shift register according to claim 1 wherein the other shift register unit half further includes an inverter and an auxiliary shift gate; and said main shift gate included in the other shift register unit half has the input connected to the output of said main shift gate included in said one shift register unit half, the output of said first-mentioned main shift gate being connected to the input of said associated inverter and said auxiliary shift gate having the input and output connected to the output and input of said associated inverter.

7. A shift register according to claim 2 wherein said main shift gate further includes at least one additional P channel IGFET having the drain-source path connected in parallel to the drain source path of said first P channel IGFET and at least one additional N channel IGFET having the drain-source path connected between the source of said first N channel IGFET and the drain of said second N channel IGFET, the gates of said additional P and N channel IGFET's being connected together to an additional input to be supplied with additional binary coded signals separate from said first-mentioned binary coded signals, thereby effecting NAND/NOR function with respect to a plurality of binary coded input signals.

8. A shift register according to claim 2 wherein said main shift gate further includes at least one additional N channel IGFET having the drain-source path connected in parallel to the drain-source path of said first N channel IGFET and at least one additional P channel IGFET having the drain-source path connected between the source of said first P channel IGFET and the drain of said second P channel IGFET, the gates of said additional N and P channel IGFET's being connected together to an additional input to be supplied with additional binary coded signals separate from said first-mentioned binary coded signals, thereby effecting NOR/NAND function with respect to a plurality of binary coded input signals.

* * * * *